United States Patent [19]

Schiavi et al.

[11] Patent Number: 4,971,934

[45] Date of Patent: Nov. 20, 1990

[54] REFRACTORY COMPOSITION

[75] Inventors: William F. Schiavi; Robert H. Herron, both of State College, Pa.

[73] Assignee: North American Refractories Company, Cleveland, Ohio

[21] Appl. No.: 397,587

[22] Filed: Aug. 23, 1989

[51] Int. Cl.$^5$ .................. C04B 35/02; C04B 35/04
[52] U.S. Cl. .................................... 501/120; 501/119; 501/118; 501/108
[58] Field of Search ............. 501/118, 119, 120; 75/28, 58; 428/404

[56] References Cited

FOREIGN PATENT DOCUMENTS 61-10051  1/1986  Japan ................................ 501/119

Primary Examiner—William R. Dixon, Jr.
Assistant Examiner—Alan A. Wright
Attorney, Agent, or Firm—Jones, Day, Reavis & Pogue

[57] ABSTRACT

A refractory brick for use in rotary cement kilns has improved properties by the addition of small quantities of $MnO_2$ to the composition used to form the brick.

11 Claims, No Drawings

REFRACTORY COMPOSITION

BACKGROUND OF THE INVENTION

This application relates to the art of refractory compositions and refractory bricks. The invention is particularly applicable to refractory compositions and bricks intended for use in rotary cement kilns. However, it will be appreciated that the invention has broader aspects, and that the improved composition and brick of the present application can be used in other environments and for other purposes.

It is known that the properties of refractory brick for use in rotary cement kilns can be enhanced by the addition of chromium oxide to the brick composition. However, environmental concerns about toxic chromium compounds has restricted the use of such compounds in refractory bricks. This is because toxic chromium compounds may be released to the environment by kiln exhaust emissions and by the disposal of spent refractory linings.

Alternatives to MgO-chrome bricks have included MgO bricks, MgO-CaO and dolomite bricks, and MgO-spinel bricks. MgO bricks are not usually used in cement kilns because of undesirable high thermal conductivity and high thermal expansion. MgO-CaO and dolomite bricks have been successfully used in the center burning zone, but have not generally proven successful in the upper and lower transition zones on either side of the center burning zone. MgO-spinel bricks have most frequently been used in place of MgO-chrome bricks in the transition zones. The performance of MgO-spinel bricks has generally been satisfactory in the upper transition zone, but not in the lower transition zone.

It would be desirable to have a refractory brick to replace MgO-chrome bricks.

SUMMARY OF THE INVENTION

The relatively poor performance of MgO-chrome substitute bricks on rotary cement kilns has generally been believed to be due to the inability of such substitutes to withstand high temperatures. Therefore, the addition of $MnO_2$ to the composition of such bricks would normally be considered undesirable, because $MnO_2$ is a flux and would be considered to reduce the ability of such bricks to withstand heat.

In accordance with the present application, it is believed that the relatively poor performance of MgO-chrome substitute bricks is due at least in part to reactions between the bricks and gases or compositions within a rotary cement kiln. It has surprisingly been found that the addition of small quantities of $MnO_2$ to the composition of bricks used in rotary cement kilns substantially improves the performance of such bricks. The improved performance is believed to be due to reduced reactivity of the brick with compounds and gases within a rotary cement kiln. The $MnO_2$ improves the resistance of the brick to reacting with other materials and gases in a rotary cement kiln.

In accordance with the application, a refractory composition is provided whose principal ingredients, in order of decreasing percent by weight of the entire composition, are MgO, $Al_2O_3$, and $MnO_2$.

The MgO content may be about 70–95% by weight of the composition. The $Al_2O_3$ content may be about 4–30% by weight of the composition, and is most preferably between about 5–23%. The $MnO_2$ content is preferably about 1.4–7.5% by weight of the entire composition.

The raw material used for providing the MgO contains at least about 90% MgO, and most preferably contains about 96–98% MgO. The remainder of the raw material used for providing the MgO consists essentially of CaO and $Si_2$. Although the raw material used to provide the MgO may contain less than about 2% of each of alumina and $Fe_2O_3$, such compounds in such small amounts are not believed to contribute any enhanced properties to the brick composition.

The raw material used to provide the MgO includes CaO and $SiO_2$ in a ratio between about 0.5 to 1 and 10 to 1 of CaO to $SiO_2$. Most preferably, the ratio is about 1 to 1.

The raw material used for providing the $Al_2O_3$ may be substantially pure alumina and/or bauxite if the $Al_2O_3$ content is not more than about 10% by weight of the entire composition. If the $Al_2O_3$ content is greater than 10% by weight of the entire composition, excluding the calcined alumina, the raw material used for providing the $Al_2O_3$ must include $MgAl_2O_4$ spinel. Most preferably, the raw material providing the granular $Al_2O_3$, and excluding the calcined alumina, includes $MgAl_2O_4$ spinel and may include one or more of substantially pure alumina and bauxite. However, the $Al_2O_3$ provided in the substantially pure alumina and/or bauxite is preferably not more than about 10% by weight of the entire composition.

A fired brick in accordance with the present application has a modulus of rupture, in pounds per square inch, of at least 400 at 70° F. and of at least 100 at 2550° F. The brick has a density of at least about 160 pounds per cubic foot and a cold crushing strength of at least about 3500 pounds per square inch.

The $MnO_2$ added to the composition is preferably a relatively fine powder so it will be dispersed throughout the mix.

It is a principal object of the present invention to provide an improved refractory composition and refractory brick that do not contain chromium oxide.

It is also an object of the invention to provide an improved refractory composition and brick for use in rotary cement kilns.

It is a further object of the invention to provide an improved refractory composition and brick having small quantities of $MnO_2$.

DESCRIPTION OF PREFERRED EMBODIMENTS

The resistance of a refractory brick against undesirably reacting with materials or gases in a rotary cement kiln is substantially improved by adding small quantities of $MnO_2$ to the brick composition.

Although $MnO_2$ is generally considered an impurity or a flux in refractory compositions, it has surprisingly been found that the addition of $MnO_2$ to a refractory brick composition substantially enhances the performance of the brick in rotary cement kilns.

The principal ingredients of a refractory composition in accordance with the present application, in order of decreasing percent by weight of the entire composition, are MgO, $Al_2O_3$ and $MnO_2$.

The $MnO_2$ is preferably provided in the amount of about 1.4–7.5% by weight of the entire composition. The raw material used for providing the MgO contains at least about 90% MgO, and the remainder consists essentially of CaO and $SiO_2$. Less than about 2% of alumina and $Fe_2O_3$ may also be present but are not believed to have a material effect on the brick properties. The CaO and $SiO_2$ are present in a ratio of about 0.5 to 1 and 10 to 1.

Most preferably, the raw material used for providing the MgO contains at least about 98% MgO and the remainder consists essentially of CaO and $SiO_2$ in a ratio of about 1 to 1.

The raw material used for providing the MgO includes about 20–40% ball milled fines and the remainder is not smaller than about −48 mesh.

In one arrangement, the raw material used for providing the MgO includes mesh sizes −6+14, −14 30 48, −48, and ball milled fines. The percent by weight of the −48 mesh size is between about 0–20%, and the percent by weight of each of the other mesh sizes and ball milled fines is between about 20–40%.

The $Al_2O_3$ provided in the composition may be included in the coarse fraction as an alumina containing raw material that contains between about 70–100% alumina. The alumina containing raw material may be substantially pure $MgAl_2O_4$ spinel containing about 50–75% alumina. The alumina containing raw material may also be substantially pure granular alumina. The alumina containing raw material may also be a calcined bauxite material containing between about 70–90% alumina. Most preferably, the alumina containing raw material is $MgAl_2O_4$ spinel. When substantially pure granular alumina and/or bauxite are used, they should not provide more than about 10% $Al_2O_3$ by weight of the entire composition.

The composition of the present application also includes a small amount of calcined alumina in the fine fraction, preferably in an amount less than the amount of $MnO_2$. The composition further includes a small quantity of binder that is generally provided in an amount less than the amount of $MnO_2$. Although different binders could be used, one that has been advantageous is lignosulfonate.

The raw material used to provide the $MnO_2$ is preferably a relatively fine powder so it will be dispersed throughout the mix. It is believed that the raw material used to provide the $MnO_2$ should not be substantially larger than about mesh size −100 for optimum performance. However, larger mesh sizes could be used if the $MnO_2$ can be thoroughly dispersed throughout the mix during mixing.

A fired brick in accordance with the present application has a density of at least 160 pounds per cubic foot, and a cold crushing strength of at least 3500 pounds per square inch.

A brick in accordance with the present application has a modulus of rupture, in pounds per square inch, of at least 400 at 70° F. and of at least 100 at 2550° F. The brick also has an apparent porosity that is not greater than about 35%.

The following is an example of a composition that has been used to make brick in accordance with the present application. In example 1, the first five ingredients are indicated as comprising 100% of the composition. The additional materials are then added in percentages based upon the 100% of the five major ingredients. In example 1 recalculated, the weight percents have been recalculated to approximate the weight by percent of each material for the entire composition.

| Raw Material Name | Mesh Size | Weight % |
|---|---|---|
| EXAMPLE 1 | | |
| 98% MM 1:1 MgO | −6 +14 | 22 |
| 98% MM 1:1 MgO | −14 +48 | 22 |
| 98% MM 1:1 MgO | −48 | 16 |
| 98% MM 1:1 MgO | Ball Milled Fines | 20 |
| MS-100 $MgAl_2O_4$ Spinel | −4 | 20 |
| A-12 Calc. Alumina | −325 | 2 added |
| Manganese Dioxide C | −270 | 6 added |
| Norlig A | | 1.5 added |
| Water | | 2 added |
| EXAMPLE 1 RECALCULATED | | |
| 98% MM 1:1 MgO | −6 +14 | 20 |
| 98% MM 1:1 MgO | −14 +48 | 20 |
| 98% MM 1:1 MgO | −48 | 14 |
| 98% MM 1:1 MgO | Ball Milled Fines | 18 |
| MS-100 $MgAl_2O_4$ Spinel | −4 | 18 |
| A-12 Calc. Alumina | −325 | 1.8 |
| Manganese Dioxide C | −270 | 5.1 |
| Norlig A | | 1.3 |
| Water | | 1.8 |

The raw materials are batched and blended in a suitable mixer, such as a muller-type of mixer. The blending cycle includes a dry mixing period followed by the addition of water and a wet mixing period.

The blended mix is then formed into brick in a refractory brick press at about 15,000 psi typical pressure. The pressed bricks are dried in an oven to remove water, and are fired to 2800° F. in a typical kiln. The fired brick may be fitted with metal plating and/or paper or ceramic fiber expansion allowance as is common practice for rotary kiln brick.

The physical properties of the fired brick made with the composition in example 1 were approximately as follows:

| PHYSICAL PROPERTIES | |
|---|---|
| Density, pcf | 177 |
| Cold Crushing Strength, psi | 4700 |
| Modulus of Rupture, psi | |
| @ 70° F. | 520 |
| @ 2550° F. | 150 |
| Apparent Porosity, % | 19 |

The physical properties may vary depending upon the mix and the use intended for the brick. The cold crushing strength is preferably at least about 3500 psi. The modulus of rupture, in psi, at 70° F. is preferably at least about 400, and at 2550° F is preferably at least about 100. The apparent porosity may be up to about 35%.

The chemical composition of the fired brick made with the mix of example 1 is as follows:

| CHEMICAL COMPOSITION - WEIGHT % | |
|---|---|
| $SiO_2$ | 0.5 |
| $Al_2O_3$ | 16.3 |
| $Fe_2O_3$ | 0.5 |
| CaO | 0.4 |
| $MnO_2$ | 4.3 |
| MgO | 78.0 |

In the chemical composition of the fired brick, the MgO is preferably about 70–95% by weight. The $Al_2O_3$ in the fired brick may be about 4–30% by weight and is most preferably between about 5–23%. The $MnO_2$ content of the fired brick is preferably between about 1.4–7.5% by weight.

In example 1, the raw material used to provide the MgO is a sintered magnesium oxide available from Martin Marietta Corporation, and known as 98% MgO 1:1. This material is about 98% MgO, has a density of 3.26 grams per cubic centimeter, and the remainder consists essentially of CaO and $SiO_2$ in a ratio of about 1 to 1.

In example 1, the $MgAl_2O_4$ is a sintered magnesium aluminate spinel known as MS-100 available from Onoda Cement Company, Ltd. This material is about 98% $MgAl_2O_4$ and has a density of about 3.30 grams per cubic centimeter.

In example 1, the calcined alumina is known as A-12 and is available from Alcoa Corporation.

In example 1, the $MnO_2$ is provided in a manganese dioxide ore grade raw material known as Manganese Dioxide C available from Chemetals, Inc. This material has a minimum of 70% $MnO_2$.

The Norlig A is a calcium lignosulfonate binder available from Reed Lignin.

A refractory grade magnesium oxide of 98% MgO with $CaO:SiO_2$ of 1:1 is preferred over 96% MgO With $CaO:SiO_2$ of 10:1.

The $MgAl_2O_4$ spinel grain sizing may include a mixture of screen fractions from coarse, such as 3 mesh, to intermediate such as $-6+14$ mesh and $-14+48$ mesh. Screen size mixtures including these fractions without ball milled fines are preferred over mixtures with ball milled fines.

The Manganese Dioxide C addition may range from about 2–10.7%. With $MnO_2$ being about 70% of the Manganese Dioxide C, this results in an $MnO_2$ addition of about 1.4–7.5%. The addition of 4.5% high purity manganese dioxide powder (98% $MnO_2$) produced a brick of similar quality as the example. When Manganese Dioxide C having 70% $MnO_2$ is used, the composition of the remainder consisted essentially of $Fe_2O_3$, $Al_2O_3$ and $SiO_2$. The remainder is unimportant, except that it should not contain oxides that will significantly flux the batch.

The fired brick made with the composition of example 1 was tested using a special slag cup test that was developed to simulate the service conditions of MgO-based brick in rotary cement kilns. Brick samples are cut into $2 \times 2 \times 2 \times$-cubes, and a 1-inch diameter hole is drilled 1-inch deep into the center of one face of each cube sample. A pellet of 0.04-lbs. slag mixture is placed into the hole, and each cube is inserted, hole face on top, into a furnace preheated to a selected temperature, typically 2600° F.

The sample is heated in the furnace for sufficient time to allow the slag to melt, penetrate, and react with the brick, typically 30-min. The heated sample is removed from the furnace and allowed to cool in ambient air for a selected time, typically 15-min. Upon removal from the furnace, a new slag pellet is placed into the slag hole in the sample. The sample cubes are handled with metal tongs which are fashioned with alloy plates approximately 2-in. square and parallel to each other.

A full test consists of seven of the above heating-/cooling cycles, unless the sample does not survive all seven cycles. When the sample has cooled to room temperature after the last cycle, it is cut in half through the slag hole and perpendicular to the top face to expose the internal structure. The slag mix composition is as follows:

| Raw Material | Weight % |
| --- | --- |
| Portland Cement | 60 |
| Epsom Salts | 2 |
| A-12 Calc. Alumina, −325 mesh | 20 |
| Black Iron Oxide Powder | 11 |
| MM 1:1 MgO ball milled fines | 7 |
| Western Bentonite | 1 added |
| Gleason Clay | 2 added |
| Norlig A | 1 added |
| Water | as needed for plastic consistency to form pellets. |

INTERPRETATION OF SLAG TEST RESULTS

The following aspects of the slag test are pertinent to the prediction of rotary cement kiln service performance.

1. The degree of slag penetration into the sample or repulsion from the sample.
2. The degree and pattern of cracking observed both externally during the test and internally after cutting the sample.
3. The degree or lack of sample deformation under the pressure applied through the tong plates in grasping and handling the samples.

The brick of the present application is believed to be superior to other chromium oxide free bricks because it exhibited clearly less cracking in the slag test, and it became pyroplastic with extended exposure to the slag. By saying the brick was pyroplastic, it is meant that rather than breaking up under stress at high temperature, the brick has the property of being capable of some flow or deformation as opposed to being brittle. The cracking pattern was similar to the cracking pattern observed in conventional successful MgO-chrome bricks in the same test. The combination of crack resistance and slag-initiated pyroplasticity is a unique characteristic not observed in any of the other chromium oxide free bricks tested.

The brick of the present application was also similar to successful MgO-chrome bricks in that it had sufficient slag penetration to allow the slag to react with the refractory to provide for adequate protective slag coating on the bricks.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A refractory composition containing at least about 70% MgO by weight of the entire composition, between about 4–30% $Al_2O_3$ by weight of the entire composition, and between about 1.4–7.5% $MnO_2$ by weight of the entire composition, at least a major portion of said $Al_2O_3$ being in the form of $MgAl_2O_4$ spinel, and said $Al_2O_3$ in a form other than $MgAl_2O_4$ spinel being not more than about 10% by weight of the entire composition.

2. The composition of claim 1 wherein said $MnO_2$ is in the form of a fine powder substantially uniformly distributed throughout said composition.

3. The composition of claim 2 wherein said $MnO_2$ fine powder is not larger than about mesh size 100.

4. The composition of claim 1 wherein each of said MgO, $Al_2O_3$ and $MnO_2$ are in said composition as completely independent raw materials and are not fused or electromelted with one another.

5. The composition of claim 4 wherein said $Al_2O_3$ includes a generally granular portion and a fine powder portion, and the amount of said fine powder portion in said composition being less than the amount of said $MnO_2$.

6. The composition of claim 5 wherein said fine powder portion is calcined $Al_2O_3$.

7. A refractory composition containing at least about 70% MgO by weight of the entire composition, between about 4–30% $Al_2O_3$ by weight of the entire composition, and between about 1.4–7.5% $MnO_2$ by weight of the entire composition, each of said MgO, $Al_2O_3$ and $MnO_2$ being in said composition as completely independent raw materials that are not fused or electromelted with one another, and said $MnO_2$ being in the form of a fine powder substantially uniformly distributed throughout said composition.

8. The composition of claim 7 wherein said $MnO_2$ fine powder is not larger than about mesh size 100.

9. The composition of claim 7 wherein said $Al_2O_3$ includes a calcined alumina portion in the form of a fine powder substantially uniformly distributed throughout said composition, said calcined alumina portion being present in an amount not greater than the amount of said $MnO_2$ and the remainder of said $Al_2O_3$ in said composition being in the form of $MgAl_2O_4$ spinel.

10. The composition of claim 9 wherein said $MgAl_2O_4$ spinel is present in an amount substantially greater than the amount of said calcined alumina.

11. A refractory composition containing at least about 70% MgO by weight of the entire composition, between about 4–30% $Al_2O_3$ by weight of the entire composition, and between about 1.4–7.5% $MnO_2$ by weight of the entire composition, said $Al_2O_3$ including a calcined alumina portion in the form of a fine powder substantially uniformly distributed throughout said composition, said calcined alumina portion being present in an amount not greater than the amount of said $MnO_2$ and the remainder of said $Al_2O_3$ in said composition being in the form of $MgAl_2O_4$ spinel, and said $MgAl_2O_4$ spinel being present in an amount substantially greater than the amount of said calcined alumina.

* * * * *